US011076448B2

(12) United States Patent
Song et al.

(10) Patent No.: US 11,076,448 B2
(45) Date of Patent: Jul. 27, 2021

(54) APPARATUS AND METHOD FOR SELECTING UPLINK BASED ON COMMUNICATION STATE

(71) Applicant: Samsung Electronics Co., Ltd., Gyeonggi-do (KR)

(72) Inventors: Byoungryoul Song, Gyeonggi-do (KR); Kyuyoung Kim, Gyeonggi-do (KR); Manseob Kim, Gyeonggi-do (KR); Yongjun Park, Gyeonggi-do (KR); Yungyu Bae, Gyeonggi-do (KR); Hoonsang Yoo, Gyeonggi-do (KR); Taelee Lee, Gyeonggi-do (KR); Joon Heo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/655,997

(22) Filed: Oct. 17, 2019

(65) Prior Publication Data

US 2020/0128622 A1 Apr. 23, 2020

(30) Foreign Application Priority Data

Oct. 18, 2018 (KR) .................. 10-2018-0124160

(51) Int. Cl.
*H04W 88/06* (2009.01)
*H04W 88/10* (2009.01)
(Continued)

(52) U.S. Cl.
CPC .......... *H04W 88/06* (2013.01); *H04B 17/318* (2015.01); *H04L 5/0051* (2013.01); *H04W 24/10* (2013.01); *H04W 88/10* (2013.01)

(58) Field of Classification Search
CPC ..... H04W 88/06; H04W 88/10; H04W 24/10; H04B 17/318; H04L 5/0051
(Continued)

(56) References Cited

U.S. PATENT DOCUMENTS 7,873,323 B2 1/2011 Drabeck et al.
9,479,915 B2 * 10/2016 Gupta ............... H04W 28/0226
(Continued)

FOREIGN PATENT DOCUMENTS

KR 20000043013 7/2000

OTHER PUBLICATIONS

International Search Report dated Feb. 11, 2020 issued in counterpart application No. PCT/KR2019/013551, 3 pages.

*Primary Examiner* — Mong-Thuy T Tran
(74) *Attorney, Agent, or Firm* — The Farrell Law Firm, P.C.

(57) ABSTRACT

A portable communication device is provided. The communication device includes a first communication circuitry configured to perform communication using a first frequency band, a second communication circuitry configured to perform communication using a second frequency band, and at least one processor configured to receive a reference signal transmitted from a first external electronic device using the first communication circuitry, and when a received power corresponding to the reference signal belongs to a specified first range, communicate with at least one external electronic device through multiple cellular connections by transmitting a first signal of the first frequency band to the first external electronic device through a first cellular connection established using the first communication circuitry and substantially concurrently transmitting a second signal of the second frequency band to a second external electronic device through a second cellular connection established using the second communication circuitry.

15 Claims, 8 Drawing Sheets

(51) Int. Cl.
*H04B 17/318* (2015.01)
*H04W 24/10* (2009.01)
*H04L 5/00* (2006.01)

(58) Field of Classification Search
USPC .......................................................... 370/329
See application file for complete search history.

(56) References Cited

U.S. PATENT DOCUMENTS

| | | |
|---|---|---|
| 9,859,947 B2 | 1/2018 | Lee et al. |
| 9,913,181 B1* | 3/2018 | Oroskar .............. H04W 52/343 |
| 10,187,168 B2 | 1/2019 | Hwang et al. |
| 10,231,280 B2 | 3/2019 | Lee et al. |
| 10,333,581 B2 | 6/2019 | Kim et al. |
| 10,484,926 B2 | 11/2019 | Panteleev et al. |
| 2007/0077890 A1 | 4/2007 | Drabeck et al. |
| 2009/0098831 A1* | 4/2009 | Deng ................... H04B 1/0067 455/73 |
| 2015/0236839 A1* | 8/2015 | Shah ................... H04W 72/042 370/329 |
| 2015/0281973 A1* | 10/2015 | Svedman ................. H04B 7/04 455/454 |
| 2016/0242083 A1* | 8/2016 | Guan ................... C07D 233/72 |
| 2016/0285505 A1 | 9/2016 | Lee et al. |
| 2017/0245317 A1 | 8/2017 | Lee et al. |
| 2017/0311177 A1* | 10/2017 | Sarkissian .............. H04J 11/005 |
| 2017/0317775 A1 | 11/2017 | Hwang et al. |
| 2018/0048347 A1 | 2/2018 | Kim et al. |
| 2018/0206176 A1 | 7/2018 | Panteleev et al. |
| 2019/0208569 A1 | 7/2019 | Lee et al. |
| 2019/0327784 A1* | 10/2019 | Tarimala ............... H04W 24/10 |
| 2020/0008188 A1* | 1/2020 | Nam ................. H04W 72/0446 |

\* cited by examiner

APPARATUS AND METHOD FOR SELECTING UPLINK BASED ON COMMUNICATION STATE

CROSS-REFERENCE TO RELATED APPLICATION(S)

This application is based on and claims priority under 35 U.S.C. § 119 to Korean Patent Application No. 10-2018-0124160, filed on Oct. 18, 2018, in the Korean Intellectual Property Office, the entire disclosure of which is incorporated herein by reference.

BACKGROUND

1. Field

The present disclosure relates generally to an electronic device for supporting transmission over multiple uplinks and a method therefor.

2. Description of Related Art

An electronic device may support cellular communication. The cellular communication may use, for example, a wireless protocol according to a communication standard standardized by $3^{rd}$ generation partnership project (3GPP). With the development of the communication standard, there has been an increase in a range of a frequency band which is available to the electronic device.

The electronic device may concurrently transmit a plurality of signals corresponding to a plurality of frequency bands to increase a transmission rate of data transmitted over an uplink. Through concurrent transmission for the plurality of frequency bands which are continuous or discontinuous, efficiency and scheduling flexibility for the use of radio resources may be increased. For example, the electronic device may use a plurality of frequency bands which belong to the same radio access technology (RAT) or may use a plurality of frequency bands which belong to different RATs.

When performing multiple uplink transmission, an electronic device may concurrently process signals corresponding to a plurality of frequency bands. For a combination of specific frequency bands, intermodulation distortion (IMD) may occur. The IMD may occur due to various causes. For example, the IMD may occur due to a non-ideal characteristic of the electronic device (e.g., a nonlinearity of a radio frequency (RF) system of the electronic device).

When the electronic device concurrently transmits a plurality of signals corresponding to the plurality of bands, noise due to the IMD may occur. For example, IMD of one signal may occur in a frequency domain adjacent to a central frequency of another signal. In this case, due to the IMD, the other signal may fail to be successfully received in a receive end. Thus, for a combination of some frequency bands, the electronic device may be configured not to perform multiple uplink transmissions. In this case, to the limit of multi-transmissions, a data transmission rate of the electronic device may be reduced.

SUMMARY

The present disclosure has been made to address at least the disadvantages described above and to provide at least the advantages described below.

In accordance with an aspect of the present disclosure, a portable communication device is provided. The device includes a first communication circuitry configured to perform communication using a first frequency band, a second communication circuitry configured to perform communication using a second frequency band, and at least one processor configured to receive a reference signal transmitted from a first external electronic device using the first communication circuitry, when a received power corresponding to the reference signal belongs to a specified first range, communicate with at least one external electronic device through multiple cellular connections by transmitting a first signal of the first frequency band to the first external electronic device through a first cellular connection established using the first communication circuitry and substantially concurrently transmitting a second signal of the second frequency band to a second external electronic device through a second cellular connection established using the second communication circuitry, and when the received power corresponding to the reference signal belongs to a specified second range, communicate with the at least one external electronic device through a single cellular connection by transmitting the first signal to the first external electronic device through the first cellular connection and refraining from transmitting the second signal to the second external electronic device through the second cellular connection.

In accordance with an aspect of the present disclosure, a base station is provided. The base station includes a memory, a communication circuitry and at least one processor configured to transmit a reference signal to an external electronic device using the communication circuitry, receive a received power corresponding to the reference signal, the received power being measured by the external electronic device, from the external electronic device, when the received power corresponding to the reference signal belongs to a specified first range, transmit information indicating communicating through multiple cellular connections to the external electronic device by transmitting a first signal of a first frequency band through a first cellular connection and substantially concurrently transmitting a second signal of a second frequency band through a second cellular connection, and when the received power corresponding to the reference signal belongs to a specified second range, transmit information indicating communicating through a single cellular connection to the external electronic device by transmitting the first signal through the first cellular connection and transmitting the second signal to the external electronic device through the second cellular connection.

In accordance with an aspect of the present disclosure, a portable communication device is provided. The device includes a memory, a first communication circuitry configured to perform communication using a first frequency band, a second communication circuitry configured to perform communication using a second frequency band, and at least one processor configured to receive a reference signal from a first external electronic device using the first communication circuitry, when a received power of the reference signal belongs to a first range, substantially concurrently transmit a first signal corresponding to at least a part of a first frequency and a second signal corresponding to at least a part of a second frequency band using the first communication circuitry and the second communication circuitry, and when the received power of the reference signal belongs to a second range, limit transmission of the second signal while transmitting the first signal using the first communication circuitry.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
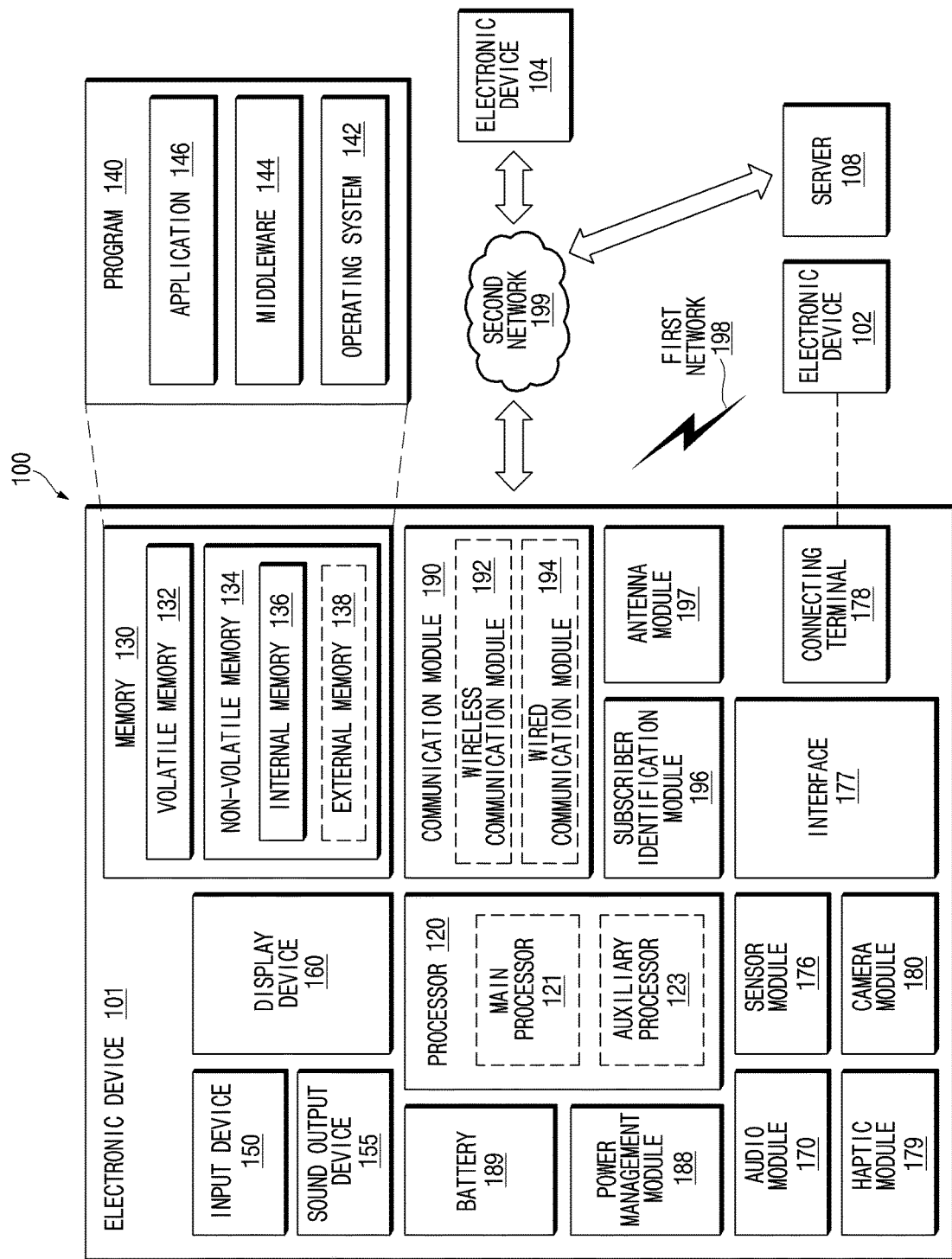
FIG. 1 is a diagram of an electronic device in a network environment, according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
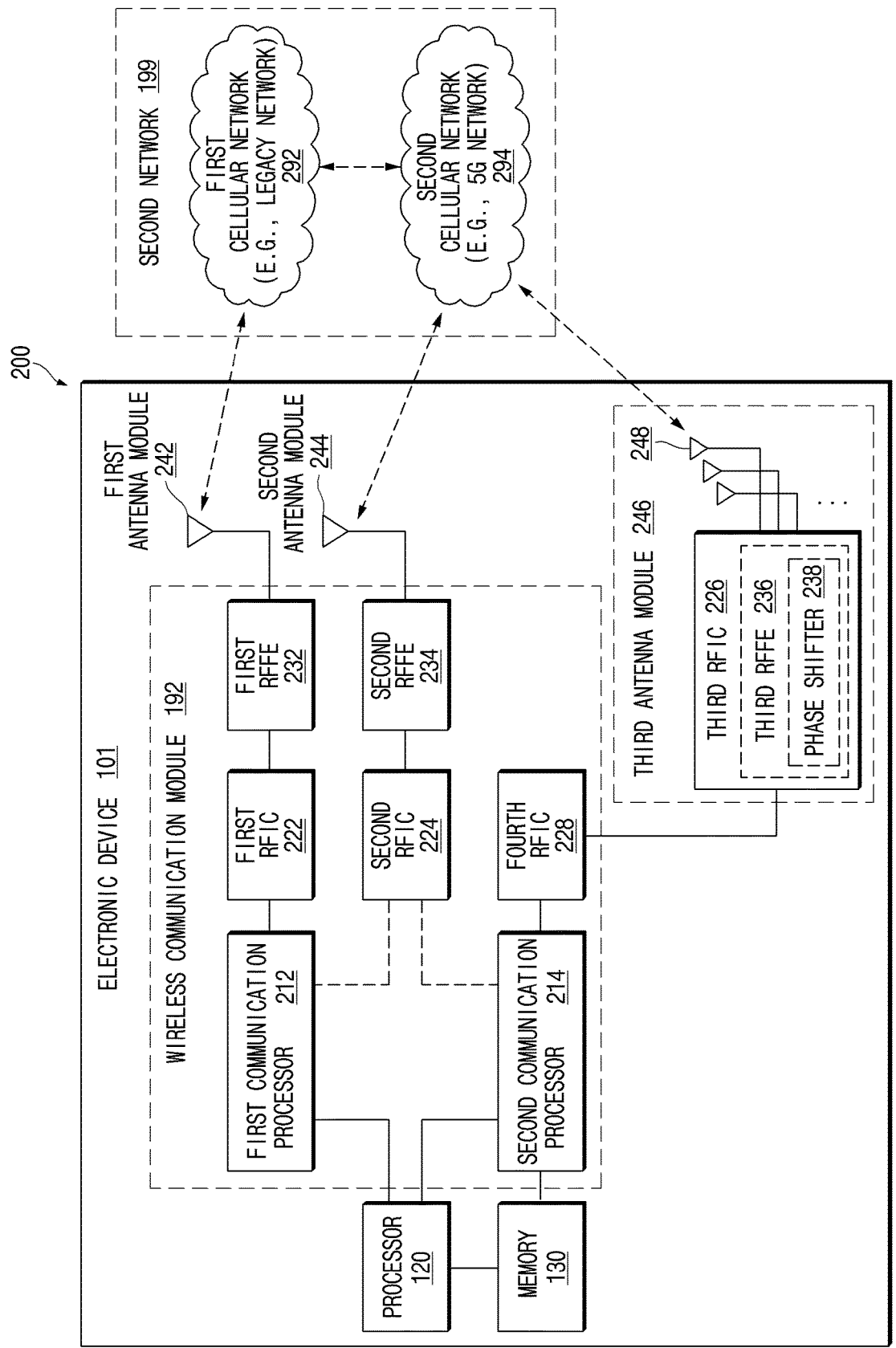
FIG. 2 is a diagram of an electronic device in a network environment including a plurality of cellular networks, according to an embodiment.

FIG. 2 is a diagram 200 of an electronic device 101 in a network environment including a plurality of cellular networks, according to an embodiment.

Referring to FIG. 2, the electronic device 101 may include a first CP 212, a second CP 214, a first radio frequency integrated circuit (RFIC) 222, a second RFIC 224, a third RFIC 226, a fourth RFIC 228, a first radio frequency front end (RFFE) 232, a second RFFE 234, a first antenna 242, a second antenna module 244, and an antenna 248. The electronic device 101 may further include a processor 120 and a memory 130. A second network 199 may include a first cellular network 292 and a second cellular network 294. The electronic device 101 may further include at least one of components shown in FIG. 1. The second network 199 may further include at least one other network. The first CP 212, the second CP 214, the first RFIC 222, the second RFIC 224, the fourth RFIC 228, the first RFFE 232, and the second RFFE 234 may configure at least a part of a wireless communication module 192. The fourth RFIC 228 may be omitted or may be included as a part of the third RFIC 226.

The first CP 212 may establish a communication channel of a band to be used for wireless communication with the first cellular network 292 and may support legacy network communication over the established communication channel. The first cellular network 292 may be a legacy network including a $2^{nd}$ generation (2G), $3^{rd}$ generation (3G), $4^{th}$ generation (4G), long term evolution (LTE) network. The second CP 214 may establish a communication channel corresponding to a specified band (e.g., about 6 GHz to about 60 GHz) among bands to be used for wireless communication with the second cellular network 294 and may support 5$^{th}$ generation (5G) network communication over the established communication channel. The second cellular network 294 may be a 5G network defined in 3$^{rd}$ generation partnership project (3GPP). In addition, the first CP 212 or the second CP 214 may establish a communication channel corresponding to another specified band (e.g., about 6 GHz or less) among bands used for wireless communication with the second cellular network 294 and may support 5G network communication over the established communication channel. The first CP 212 and the second CP 214 may be implemented in a single chip or a single package. The first CP 212 or the second CP 214 may be configured together with the processor 120, an auxiliary processor 123, or a communication module 190 in a single chip or a single package.

Upon transmission, the first RFIC 222 may convert a baseband signal generated by the first CP 212 into an RF signal of about 700 MHz to about 3 GHz used for the first cellular network 292 (e.g., the legacy network). Upon reception, an RF signal may be obtained from the first cellular network 292 (e.g., the legacy network) via an antenna (e.g., the first antenna module 242) and may be preprocessed via an RFFE (e.g., the first RFFE 232). The first RFIC 222 may convert the preprocessed RF signal into a baseband signal to be able to be processed by the first CP 212.

Upon transmission, the second RFIC 224 may convert a baseband signal generated by the first CP 212 or the second CP 214 into an RF signal of a Sub6 band (e.g., about 6 GHz or less) (hereinafter "5G Sub6 RF signal") used for the second cellular network 294 (e.g., the 5G network). Upon reception, a 5G Sub6 RF signal may be obtained from the second cellular network 294 (e.g., the 5G network) via an antenna (e.g., the second antenna module 244) and may be preprocessed via an RFFE (e.g., the second RFFE 234). The second RFIC 224 may convert the preprocessed 5G Sub6 RF signal into a baseband signal to be able to be processed by a corresponding CP between the CP 212 or the second CP 214.

The third RFIC 226 may convert a baseband signal generated by the second CP 214 into an RF signal of a 5G Above6 band (e.g., about 6 GHz to about 60 GHz) (hereinafter "5G Above6 RF signal") to be used in the second cellular network 294 (e.g., the 5G network). Upon reception, a 5G Above6 RF signal may be obtained from the second cellular network 294 (e.g., the 5G network) via an antenna 248 and may be preprocessed via the third RFFE 236. The third RFIC 226 may convert the preprocessed 5G Above6 RF signal into a baseband signal to be able to be processed by the second CP 214. According to an embodiment, the third RFFE 236 may be configured as a part of the third RFIC 226.

The electronic device 101 may include the fourth RFIC 228 independently of the third RFIC 226 or as at least a part of the third RFIC 226. In this case, the fourth RFIC 228 may convert a baseband signal generated by the second CP 214 into an RF signal of an intermediate frequency band (e.g., about 9 GHz to about 11 GHz) (hereinafter "IF signal") and may delivery the IF signal to the third RFIC 226. The third RFIC 226 may convert the IF signal into a 5G Above6 RF signal. Upon reception, a 5G Above6 RF signal may be received from the second cellular network 294 (e.g., the 5G network) via an antenna 248 and may be converted into an IF signal by the third RFIC 226. The fourth RFIC 228 may convert the IF signal into a baseband signal to be able to be processed by the second CP 214.

The first RFIC 222 and the second RFIC 224 may be implemented as at least a part of a single chip or a single package. The RFFE 232 and the second RFFE 234 may be implemented as at least a part of a single chip or a single package. At least one of the first antenna module 242 or the second antenna module 244 may be omitted or may be combined with another antenna module to process RF signals of a plurality of corresponding bands.

The third RFIC 226 and the antenna 248 may be arranged on the same substrate to configure the third antenna module 246. The wireless communication module 192 or the processor 120 may be arranged on a first substrate (e.g., a main printed circuit board (PCB)). In this case, as the third RFIC 226 is disposed on a partial region (e.g., a lower surface) of a second substrate (e.g., a sub-PCB) independent of the first substrate and as the antenna 248 is disposed on another partial region (e.g., an upper surface), the third antenna module 246 may be configured. As the third RFIC 226 and the antenna 248 are arranged on the same substrate, it is possible to reduce a length of a transmission line between the third RFIC 226 and the antenna 248. This may reduce a signal of a high frequency band (e.g., about 6 GHz to about 60 GHz) used for 5G network communication being lost (e.g., attenuated) by the transmission line. Due to this, the electronic device 101 may enhance quality or speed of communication with the second cellular network 294 (e.g., the 5G network).

The antenna 248 may be configured as an antenna array including a plurality of antenna elements which are available for beamforming. In such a case, the third RFIC 226 may include a plurality of phase shifters 238, as a part of the third RFFE 236, corresponding to the plurality of antenna elements. Upon transmission, each of the plurality of phase shifters 238 may convert a phase of a 5G Above6 RF signal to be transmitted to the outside (e.g., a base station of a 5G network) of the electronic device 101 via a corresponding antenna element. Upon reception, each of the plurality of phase shifters 238 may convert a phase of a 5G Above6 RF signal received from the outside via a corresponding antenna element into the same or substantially the same phase. This facilitates transmission or reception through beamforming between the electronic device 101 and the outside.

The second cellular network 294 (e.g., the 5G network) may be operated independently of the first cellular network 292 (e.g., the legacy network) (e.g., stand-alone (SA)) or may be connected and operated with the first cellular network 292 (e.g., the legacy network) (e.g., non-standalone (NSA)). For example, there may be only an access network (e.g., a 5G radio access network (RAN) or a next generation RAN (NG RAN)) in the 5G network and there may be no core network (e.g., next generation core (NGC)) in the 5G network. In this case, the electronic device 101 may access the access network of the 5G network and may access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 and may be accessed by another component (e.g., the processor 120, the first CP 212, or the second CP 214).

Figure 3:
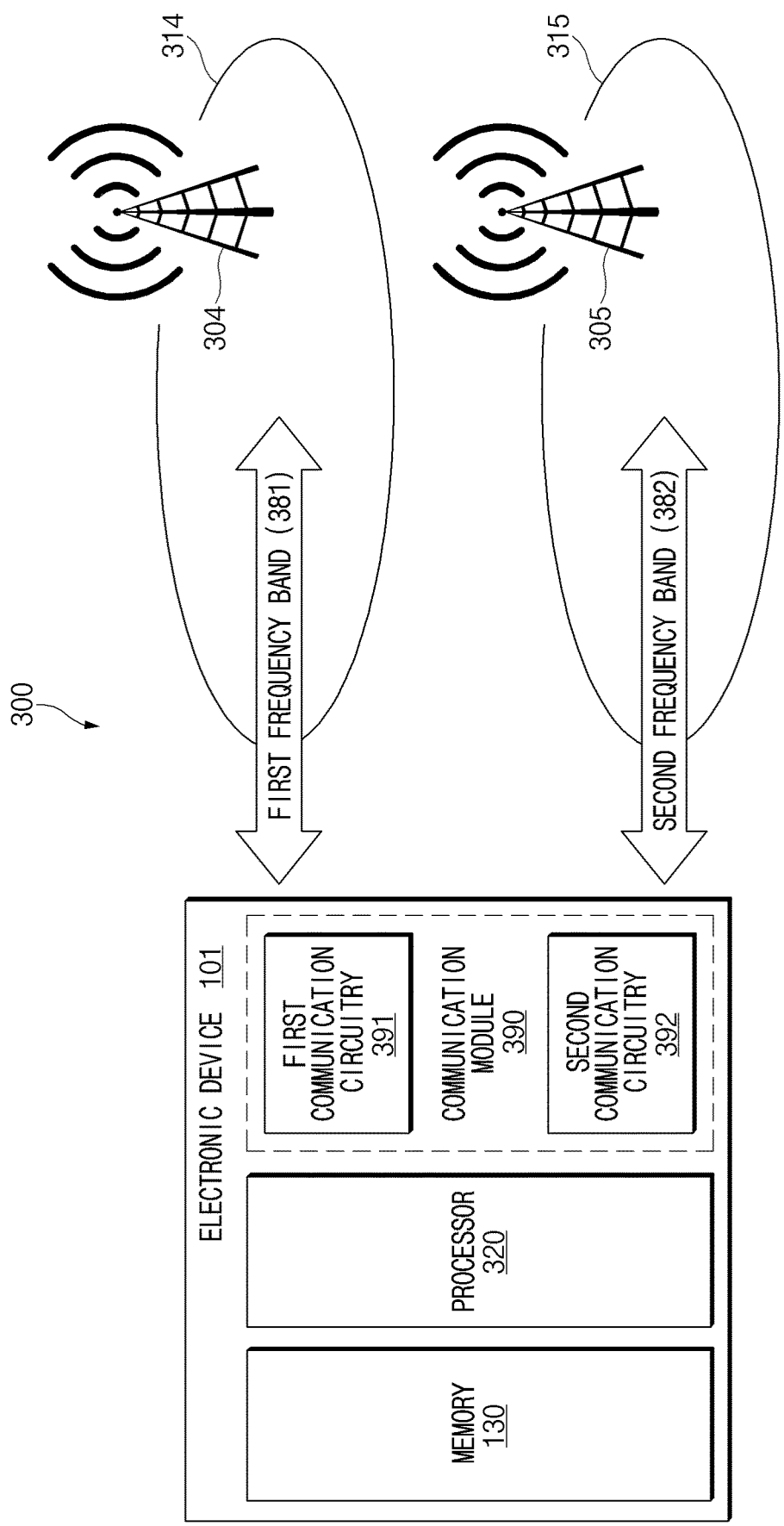
FIG. 3 is a diagram of multi transmission and reception of an electronic device in various wireless network environments, according to an embodiment.

FIG. 3 is a diagram of multi transmission and reception of an electronic device 101 in various wireless network environments 300, according to an embodiment.

Referring to FIG. 3, the electronic device 101 may include a memory 130, a processor 320, and a communication module 390. The processor 320 may include a processor 120, a first CP 212, and/or a second CP 214. The communication module 390 may include a first RFIC 222, a first RFFE 232, a first antenna module 242, a second RFIC 224, a second RFFE 234, a second antenna module 244, a fourth RFIC 228, and/or a third antenna module 246. The memory 130 may be electrically or operatively connected with the processor 320 and/or the communication module 390. The processor 320 may be electrically or operatively connected with the memory 130 and/or the communication module 390. The electronic device 101 may be referred to as a portable communication device.

The processor 320 may include a plurality of processors (e.g., the first CP 212 and the second CP 214) which are classified logically or physically.

The communication module 390 may include a first communication circuitry 391 and a second communication circuitry 392. The first communication circuit 391 may be configured to transmit and receive a signal in a first frequency band 381 (e.g., an LTE frequency band), and the second communication circuitry 392 may be configured to transmit and receive a signal in a second frequency band 392 (e.g., an NR frequency band). A maximum frequency of the second frequency band 382 may be higher than a maximum frequency of the first frequency band 381. The first communication circuitry 391 and the second communication circuitry 392 may refer to different transmit (Tx) chains or receive (Rx) chains, which are operable concurrently or substantially concurrently. The first communication circuitry 391 may include the first RFIC 222, the first RFFE 232, and/or the first antenna module 242 of FIG. 2. The second communication circuitry 392 may include the second RFIC 224, the second RFFE 234, and/or the second antenna module 244 of FIG. 2. The first communication circuitry 391 and the second communication circuitry 392 may be configured to transmit and receive a signal in different frequency bands (e.g., channels) of the same RAT. The first communication circuitry 391 and the second communication circuitry 392 may be configured to transmit and receive a signal in frequency bands of different RATs.

Referring to FIG. 3, the electronic device 101 may support dual connectivity. For example, the electronic device 101 may perform the dual connectivity with a first external electronic device 304 and a second external electronic device 305. The electronic device 101 may support dual connectivity in the same RAT or dual connectivity in different RATs. The electronic device 101 may support multi RAT dual connectivity. The electronic device 101 may be a user equipment (UE) which supports evolved universal terrestrial radio access (EUTRA)-NR dual connectivity (EN-DC). The electronic device 101 may communicate with an external electronic device (e.g., the first external electronic device 304 and/or the second external electronic device 305) using the communication module 390. The first external electronic device 304 may be a base station associated with a first cell 314, and the second external electronic device 305 may be a base station associated with a second cell 315. The first external electronic device 304 and the second external electronic device 305 may be base stations which support different RATs. The first external electronic device 304 may be an enodeB (eNB), and the second external electronic device 305 may be a next generation nodeB (gNB).

The electronic device 101 may communicate with the external electronic device 304 (or the first cell 314) using the first frequency band 381 and may communicate with the second external electronic device 304 (or the second cell 315) using the second frequency band 382. The electronic device 101 may communicate with the first external electronic device 304 and the second external electronic device 305 in a NSA mode. The electronic device 101 may transmit control data (e.g., radio access allocation and radio resource information) and user data (e.g., data except for the control data) to the first external electronic device 304 or may receive control data and user data from the first external electronic device 304, and may transmit and receive only user data with the second electronic device 305. The electronic device 101 may be connected with the second external electronic device 305 with the assistance of the first external electronic device 304.

The first external electronic device 304 and/or the second external electronic device 305 may be a base station which supports LTE and NR protocols. The first external electronic device 304 and/or the second external electronic device 305 may have a separate radio access point depending on an RAT or frequency and may include one processing unit (e.g., an evolved packet core (EPC) and a 5G next generation core (NGC)) configured to transmit and receive data using the separate radio access point.

The first external electronic device 304 and/or the second external electronic device 305 may be a base station which supports carrier aggregation under an LTE protocol or an NR protocol.

In FIG. 3, the first external electronic device 304 and the second external electronic device 305 are shown as separate base stations, but the first external electronic device 304 and the second external electronic device 305 are implemented as one base station. The first external electronic device 304 and the second external electronic device 305 may be implemented as one base station connected to the EPC and the NGC. The electronic device 101 may communicate with the first external electronic device 304 and the second external electronic device 305, which are implemented as one base station according to carrier aggregation, over a first channel corresponding to the first frequency band 381 and a second channel corresponding to the second frequency band 382. The first channel and the second channel may be associated with different cells.

Referring to FIG. 3, the first frequency band 381 may be a frequency band defined in the LTE protocol, and the second frequency band 382 may be a frequency band (e.g., a 5G Sub6 band or a 5G Above6 band) defined in the NR protocol.

The electronic device 101 may support transmission of a wireless signal over multiple uplinks. The electronic device 101 may concurrently or substantially concurrently transmit a first signal corresponding to at least a part of the first frequency band 381 and a second signal corresponding to at least a part of the second frequency band 382.

The electronic device 101 may perform multi-transmission based on an electric field situation (e.g., a communication environment). A combination of the first frequency band 381 and the second frequency band 382 or a combination of the first signal and the second signal may be a combination in which it is able for at least one signal to cause intermodulation distortion (IMD) noise for another signal. The substantially concurrently transmitting the first signal and the second signal may cause an IMD signal component of the first signal for the second signal. When the combination of the first frequency band 381 and the second frequency band 382 or the combination of the first signal and the second signal corresponds to a specified combination, the electronic device 101 may perform transmission of a wireless signal over the multiple uplinks based on the electric field situation. When the electric field situation is good, the electronic device 101 may transmit a signal with a relatively low power. In this case, strength of IMD noise by the transmission of the wireless signal over the multiple uplinks (e.g., IMD noise of the second signal by the first signal) may also be reduced. Thus, despite IMD, the first signal and the second signal may be successfully transmitted to the external electronic device. When the electric field situation belongs to a specified first range, the electronic device 101 may transmit a wireless signal over an uplink using both the first communication circuitry 391 and the second communication circuitry 392. When the electric field situation is bad, because a signal to interference plus noise ratio (SINR) is low, when concurrently transmitting the first signal and the second signal, the external electronic device may fail in receiving at least one of the first signal or the second signal. When the electric field situation belongs to a specified second range, the electronic device 101 may transmit a wireless signal over the uplink using the first communication circuitry 391 or the second communication circuitry 392.

The electronic device 101 may identify an electric field situation based on a reference signal received power. The electronic device 101 may receive a reference signal from the external electronic device. When the reference signal received power is greater than or equal to a specified threshold value (e.g., a threshold) stored in the memory 130, the electronic device 101 may concurrently or substantially concurrently transmit the first signal and the second signal. When the reference signal received power is less than the specified threshold value, the electronic device 101 may transmit the first signal or the second signal. The electronic device 101 may identify an electric field situation based on a reference signal received power for a specified frequency band. The electronic device 101 may identify an electric field situation based on a reference signal received power for a frequency band indicated by information received from the first external electronic device 304.

The electronic device 101 may obtain a reference signal received power and an electric field situation from a reference signal received from the first frequency band 381 and/or a reference signal received from the second frequency band 382. When a received power of the reference signal received from the first frequency band 381 is greater than or equal to a threshold value, the electronic device 101 may concurrently or substantially concurrently transmit the first signal and the second signal. When a received power of the reference signal received from the second frequency band 382 is greater than or equal to the threshold value, the electronic device 101 may concurrently or substantially concurrently transmit the first signal and the second signal. When a value calculated based on received powers of reference signals received from the first frequency band 381 and the second frequency band 382 is greater than or equal to the threshold value, the electronic device 101 may concurrently or substantially concurrently transmit the first signal and the second signal.

The threshold value may be a value set for a combination of the first frequency band 381 and the second frequency band 382 The threshold value may be a value set for a combination of a frequency band (e.g., a component carrier frequency band) corresponding to the first signal and a frequency band corresponding to the second signal. Threshold values set for combinations of different frequency bands may differ from each other. The threshold value may be set to have a lower value as an IMD order is higher by the first signal which has an influence on the second signal. A first threshold value set when second-order IMD of the first signal has an influence on the second signal may be higher than a second threshold value set when third-order IMD of the first signal has an influence on the second signal. When a band, a central frequency of which is about 1740 MHz in band B3 on the LTE standard, and a band, a central frequency of which is about 3575 MHz in band n78 on the NR standard, are combined with each other, a second-order IMD component may be represented in band 78. In this case, the threshold may be set to about −60 dBm. A band, a central frequency of which is 1765 MHz in band B3 and a band, a central frequency of which is about 3435 Mhz in band n78, are combined with each other, a four-order IMD component may be represented in band 78. In this case, the threshold may be set to about −80 dBm lower than a second-order IMD component. When a band, a central frequency of which is about 705.5 MHz in band B28, and a band, a central frequency of which is about 3582.5 MHz in band n78, are combined with each other, a five-order IMD component may be represented in band n78. In this case, the threshold may be set to about −86 dBm lower than the four-order IMD component.

The threshold value may be a value stored in the memory 130. The electronic device 101 may obtain information including each band combination or component carrier combination in which it is able for IMD to occur and a threshold value for each combination from the memory 130.

The threshold value may be derived from a reference sensitivity and one or more offsets. The reference sensitivity may refer to a reference value used to identify strength of a received signal. The threshold value may be derived from the reference sensitivity and maximum sensitivity degradation (MSD) set for a frequency band or channel combination. The threshold value may be derived from the reference sensitivity and an offset set for the frequency band combination and/or the channel combination. The threshold value may be derived from the reference sensitivity, MSD set for a frequency band combination/channel combination, and an offset set for the frequency band combination/channel combination.

The electronic device 101 may compare a reference signal received power with a threshold value based on data to be transmitted. The electronic device 101 may compare the reference signal received power with the threshold value based on at least one of an amount of data to be transmitted or a type of application associated with the data to be transmitted. Only when the amount of the data to be transmitted is greater than or equal to a specified amount, the electronic device 101 may compare the reference signal received power with the threshold value to determine single transmission or multi-transmission. Only when the application associated with the data to be transmitted is a specified type of application, the electronic device 101 may compare the reference signal received power with the threshold value to determine single transmission or multi-transmission. Only when the application associated with the data to be transmitted is the specified type of application and only when the amount of the data to be transmitted is greater than or equal to the specified amount, the electronic device 101 may compare the reference signal received power with the threshold value to determine single transmission or multi-transmission.

The electronic device 101 may determine single transmission or multi-transmission based on a distance from the first external electronic device 304 or the second external electronic device 305. When a distance between the electronic device 101 and the first external electronic device 304 and/or a distance between the electronic device 101 and the second electronic device 305 is less than a specified distance, the electronic device 101 may determine the multi-transmission. The electronic device 101 may obtain a distance between the electronic device 101 and the first external electronic device 304 using a signal received from the first external electronic device 304. The electronic device 101 may obtain a distance between the electronic device 101 and the second external electronic device 305 using a signal received from the second external electronic device 305. The electronic device 101 may obtain a distance from the first electronic device 304 or the second external electronic device 305 based on received strength of a signal received from the first external electronic device 304 or the second electronic device 305 and/or a round trip time (RTT).

Figure 4:
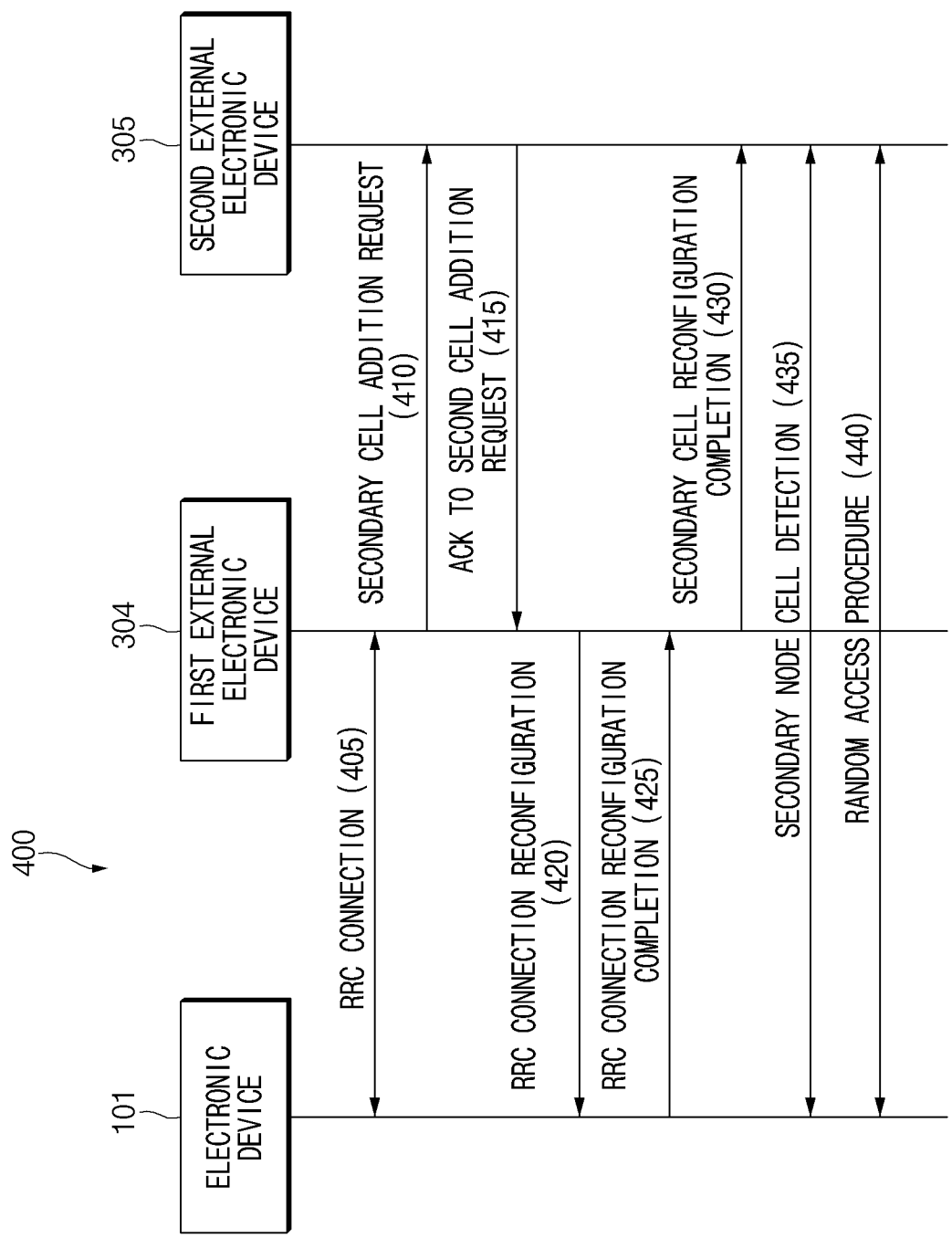
FIG. 4 is a diagram of a dual connectivity procedure of an electronic device, according to an embodiment.

FIG. 4 is a diagram of a dual connectivity procedure 400 of an electronic device 101, according to an embodiment.

At step 405, an electronic device 101 (e.g., a communication module 190 of FIG. 1) may perform a radio resource control (RRC) connection procedure with a first external electronic device 304. While the RRC connection procedure is performed, the electronic device 101 may transmit capability information of the electronic device 101 (e.g., UE capability information) to the first external electronic device 304.

At step 410, the first external electronic device 304 may transmit a secondary cell addition request to a second external electronic device 305. When the electronic device 101 supports EN-DC, the first external electronic device 304 may transmit the secondary cell addition request to the second external electronic device 305. The first external electronic device 304 may identify whether the electronic device 101 supports the EN-DC based on the capability information of the electronic device 101, received from the electronic device 101 (e.g., during step 405).

At step 415, the first external electronic device 304 may receive an acknowledgement (ACK) to the secondary cell addition request from the second external electronic device 305.

At step 420, the first external electronic device 304 may transmit an RRC connection reconfiguration message to the electronic device 101. The RRC connection reconfiguration message may include information for a connection with the second external electronic device 305.

At step 425, the electronic device 101 may transmit an RRC connection reconfiguration completion message to the first external electronic device 304.

At step 430, the first external electronic device 304 may transmit a secondary cell reconfiguration completion message to the second external electronic device 305. When the RRC connection reconfiguration completion message is received from the electronic device 101, the first external electronic device 304 may notify the second external electronic device 305 that the RRC connection reconfiguration procedure is completed.

At step 435, the electronic device 101 may perform secondary node cell detection. The electronic device 101 may perform cell detection by receiving a synchronization signal block from the second external electronic device 305 based on information included in the RRC connection reconfiguration message.

At step 440, the electronic device 101 may perform a random access procedure for the second electronic device 305. When successfully detecting a synchronization signal block associated with the second external electronic device 305, the electronic device 101 may perform the random access procedure for the second external electronic device 305.

Referring again to FIG. 3, the electronic device 101 may transmit a first signal corresponding to a band of at least a part of a first frequency band 381 to the first external electronic device 304 and may transmit a second signal corresponding to a band of at least a part of a second frequency band 382 to the second external electronic device 305. Although the electronic device 101 is connected to the first external electronic device 304 and the second external electronic device 305 as described in detail with reference to FIG. 4, it may fail to concurrently perform uplink transmission to the first external electronic device 304 and the second external electronic device 305. A combination of the first frequency band 381 and the second frequency band 382 or a combination of the first signal and the second signal may be a combination in which it is able for at least one signal to cause IMD noise for another signal.

When the combination of the first frequency band 381 and the second frequency band 382 or a combination of a frequency of the first signal and a frequency of the second signal corresponds to a specified combination (e.g., a combination in which it is able for quality degradation by IMD noise to occur), the electronic device 101 may transmit a signal over multiple uplinks based on an electric field situation. When the electric field situation belongs to a specified first range, the electronic device 101 may transmit a wireless signal to the first external electronic device 304 and the second external electronic device 305 over an uplink using both of a first communication circuitry 391 and a second communication circuitry 392. When the electric field situation belongs to a specified second range, the electronic device 101 may perform uplink transmission to the first external electronic device 304 or the second external electronic device 305 using the first communication circuitry 391 or the second communication circuitry 392. The first range may correspond to an electric field situation better than the second range. A lower limit of the first range may be greater than or equal to an upper limit of the second range.

The electronic device 101 may identify an electric field situation based on a reference signal received power. The electronic device 101 may receive a reference signal from the first external electronic device 304 and/or the second external electronic device 305. When a received power of the reference signal is greater than or equal to a specified threshold value, the electronic device 101 may concurrently or substantially concurrently transmit the first signal and the second signal. When the received power of the reference signal is less than the specified threshold value, the electronic device 101 may transmit the first signal or the second signal. The electronic device 101 may identify an electric field situation based on a reference signal received power for a specified frequency band. The electronic device 101 may identify an electric field situation based on a reference signal received power for a frequency band (e.g., the second frequency band 382) indicated by information received from the first external electronic device 304.

The electronic device 101 may obtain a reference signal received power and an electric field situation from a reference signal received from the first frequency band 381 and/or a reference signal received from the second frequency band 382. When a received power of the reference signal received from the first frequency band 381 is greater than or equal to a threshold value, the electronic device 101 may concurrently or substantially concurrently transmit the first signal and the second signal. When a received power of the reference signal received from the second frequency band 392 is greater than or equal to the threshold value, the electronic device 101 may concurrently or substantially concurrently transmit the first signal and the second signal. When a value calculated based on the received powers of the reference signals received from the first frequency band 381 and the second frequency band 382 is greater than or equal to the threshold value, the electronic device 101 may concurrently or substantially concurrently transmit the first signal and the second signal. A description of a change in threshold refers to the description of the threshold described in detail with reference to FIG. 2.

A description will be given of transmission of a wireless signal over multiple uplinks of the electronic device 101 with reference to FIGS. 5 to 8. Hereinafter, the term "transmission mode" may refer to an operation where the electronic device 101 performs single/multiple uplink transmission, or a setting, parameter, or flag for allowing the electronic device 101 to perform the single/multiple uplink transmission.

Figure 5:
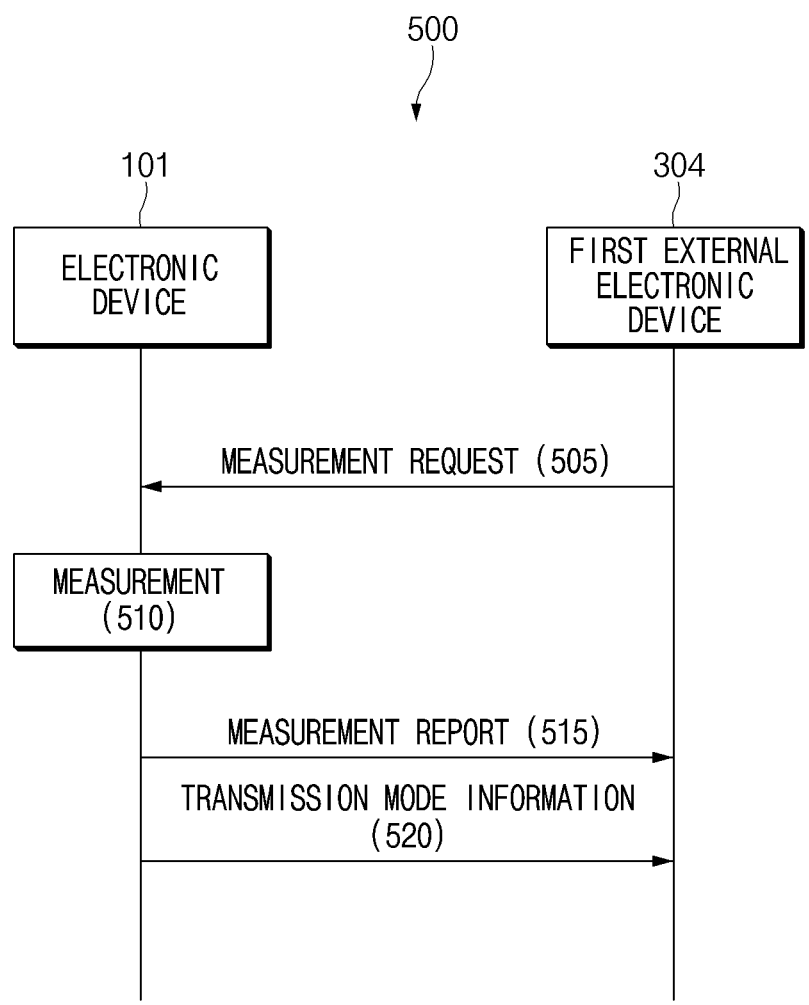
FIG. 5 is a diagram of a method for setting a transmission mode of an electronic device, according to an embodiment.

FIG. 5 is a diagram of a method 500 for setting a transmission mode of an electronic device 101, according to an embodiment.

The electronic device 101 (e.g., a communication module 190 of FIG. 1) may perform single transmission or multi-transmission based on a command by a first external electronic device 304.

At step 505, the electronic device 101 may receive a measurement request from the first external electronic device 304. The measurement request may include a reference signal and/or measurement request information to be measured. The measurement request may be transmitted through an RRC connection reconfiguration message.

At step 510, the electronic device 101 may perform measurement. The electronic device 101 may perform measurement of a reference signal indicated by the measurement request. The electronic device 101 may measure information indicated by the measurement request information. The first external electronic device 304 may request a reference signal received power (RSRP), reference signal received quality (RSRQ), and/or a signal to interference plus noise ratio (SINR) as a part of the measurement request information from the electronic device 101.

At step 515, the electronic device 101 may transmit a measurement report to the first external electronic device 304. The electronic device 101 may transmit the measurement report including the information indicated by the measurement request information to the first external electronic device 304.

At step 520, the electronic device 101 may receive transmission mode information from the first external electronic device 304. The first external electronic device 304 may transmit transmission mode information indicating a single transmission mode or a multi-transmission mode to the electronic device 101 based on the received measurement report. The first external electronic device 304 may determine the transmission mode information based on the measurement report from the electronic device 101 and may transmit information of the determined transmission mode to the electronic device 101. When the measurement report indicates a specified first range, the first external electronic device 304 may transmit the transmission mode information indicating the multi-transmission mode to the electronic device 101. When the measurement report indicates a specified second range, the first external electronic device 304 may transmit the transmission mode information indicating the single transmission mode to the electronic device 101. The transmission mode information may be transmitted to the electronic device 101 through higher layer signaling (e.g., RRC signaling). The transmission mode information may be transmitted through medium access control (MAC) signaling or over a physical downlink control channel (PDCCH).

In connection with FIG. 5, it is described that the first external electronic device 304 determines the transmission mode based on the measurement report from the electronic device 101, but embodiments of the disclosure are not limited thereto. At least one of steps 505, 510, or 515 may be omitted. The first external electronic device 304 may determine a transmission mode based on intensity of a received signal received from the electronic device 101. When intensity of a signal received from the electronic device 101 is greater than or equal to a threshold value, the first external electronic device 304 may transmit the transmission mode information indicating the multi-transmission mode to the electronic device 101. When the intensity of the received signal is less than the threshold value, the first external electronic device 304 may transmit the transmission mode information indicating the single transmission mode to the electronic device 101. The first external electronic device 304 may determine a transmission mode based on a distance between the first external electronic device 304 and the electronic device 101. The first external electronic device 304 may identify a distance between the first external electronic device 304 and the electronic device 101 based on intensity of a signal received from the electronic device 101, received intensity of a signal from the first external electronic device 101, measured by the electronic device 101, and/or location information (e.g., geographical location information) of the electronic device 101. In this case, when the distance is less than a specified threshold distance, the first external electronic device 304 may transmit the transmission mode information indicating the multi-transmission mode to the electronic device 101. When the distance is greater than or equal to the specified threshold distance, the first external electronic device 304 may transmit the transmission mode information indicating the single transmission mode to the electronic device 101.

Figure 6:
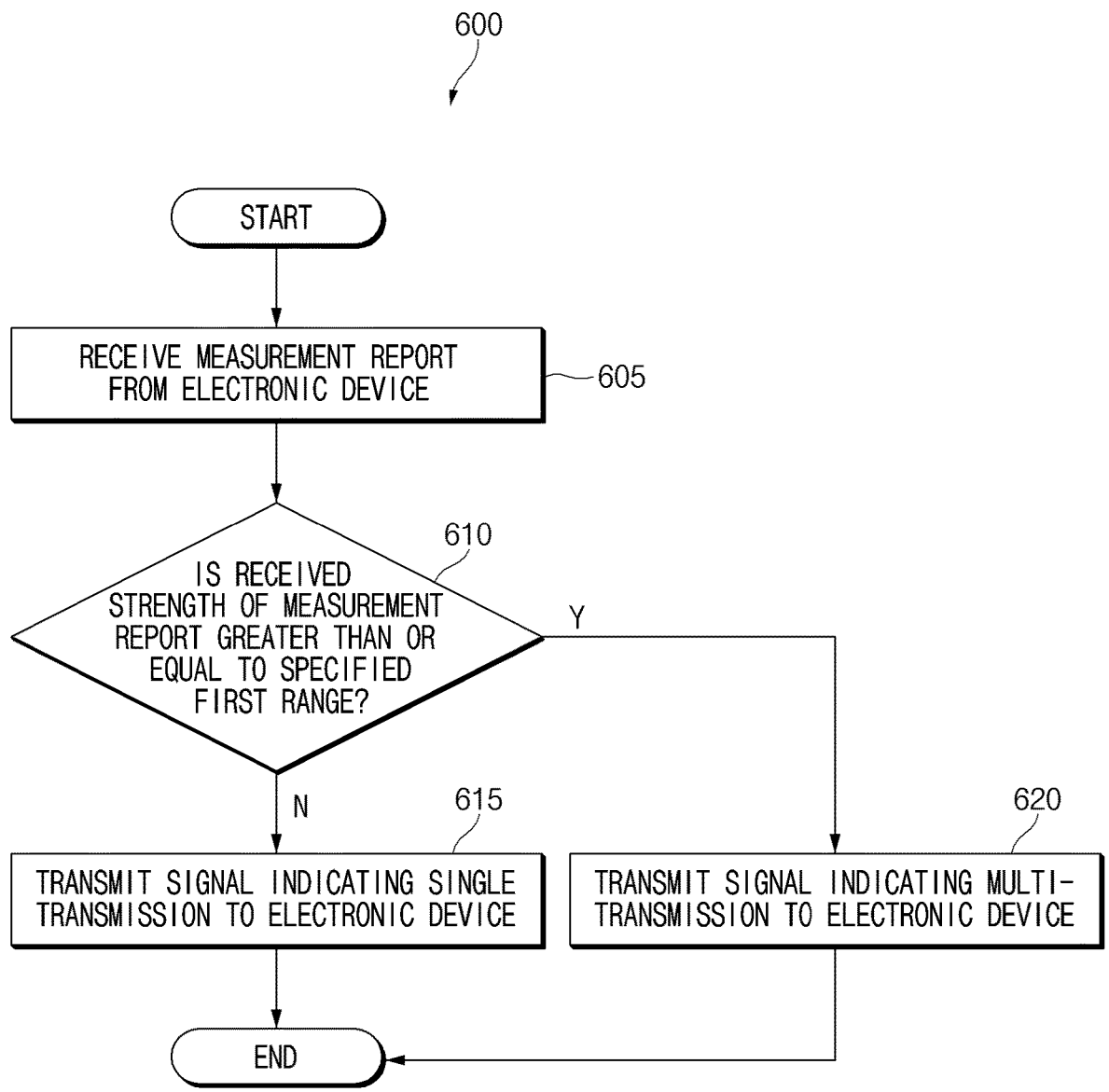
FIG. 6 is a flowchart of a method for setting a transmission mode of an electronic device in a first external electronic device, according to an embodiment.

FIG. 6 is a flowchart of a method 600 for setting a transmission mode of an electronic device 101 in a first external electronic device 304, according to an embodiment.

At step 605, the first external electronic device 304 may receive a measurement report from an electronic device 101. Step 605 may correspond to step 515 of FIG. 5.

At step 610, the first external electronic device 304 may identify whether received strength of the measurement report is greater than or equal to a specified first range. Received strength information included in the measurement report is greater than or equal to the threshold value described in detail with reference to FIG. 2, the first external electronic device 304 may identify that the received strength of the measurement report is greater than or equal to the specified first range.

When the received strength is less than the specified first range, at step 615, the first external electronic device 304 may transmit a signal indicating single transmission to the electronic device 101.

When the received strength is greater than or equal to the specified first range, at step 620, the first external electronic device 304 may transmit a signal indicating multi-transmission to the electronic device 101.

Figure 7:
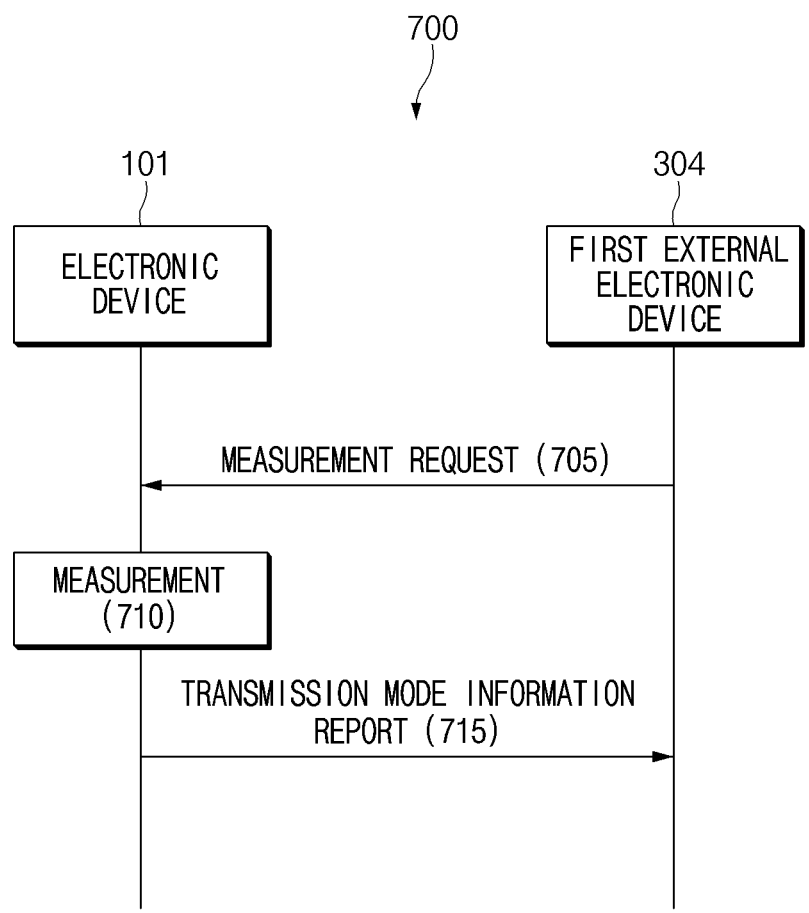
FIG. 7 is a diagram of a method for identifying a transmission mode of an electronic device, according to an embodiment.

FIG. 7 is a diagram of a method 700 for identifying a transmission mode of an electronic device 101, according to an embodiment.

The electronic device 101 (e.g., a communication module 190 of FIG. 1) may identify single transmission or multi-transmission based on a reference signal received state.

At step 710, the electronic device 101 may perform measurement. The electronic device 101 may perform measurement of a reference signal indicated by a measurement request received from a first external electronic device 304. The electronic device 101 may measure information indicated by measurement request information. The first external electronic device 304 may request a reference signal received power (RSRP), reference signal received quality (RSRQ), and/or a signal to interference plus noise ratio (SINR) as a part of the measurement request information from the electronic device 101. Thee electronic device 101 may perform measurement of a reference signal at a specified period or based on a specified event.

At step 715, the electronic device 101 may transmit a transmission mode information report to the first external electronic device 304. The electronic device 101 may identify a multi-transmission mode or a single transmission mode based on a measured electric field state and may transmit transmission mode information indicating the identified transmission mode to the first external electronic device 304. The electronic device 101 may transmit the transmission mode information using RRC signaling (e.g., RRC_UE_capability). For another example, the electronic device 101 may transmit the transmission mode information using a newly defined signal.

Figure 8:
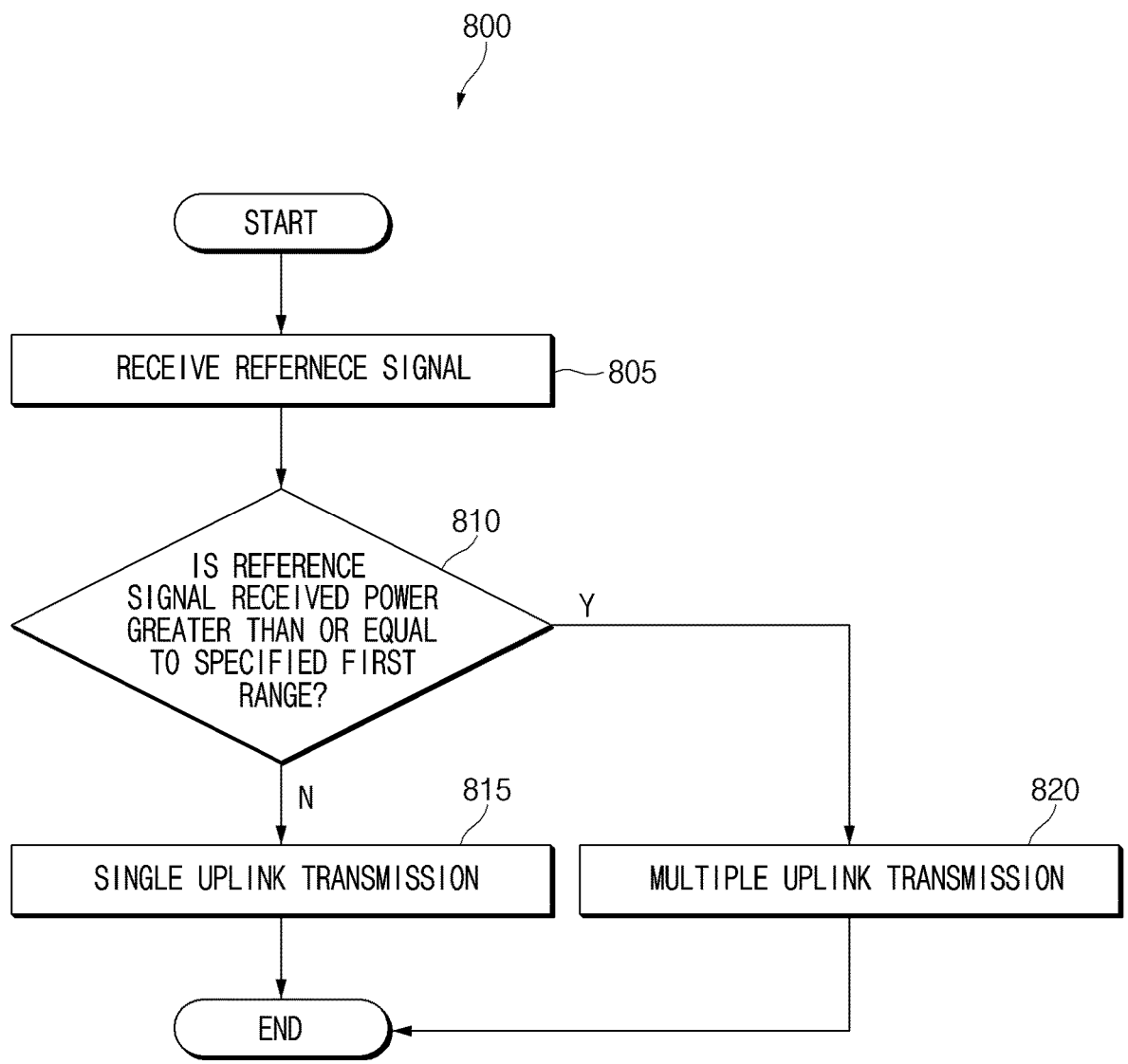
FIG. 8 is a flowchart of a method for identifying a transmission mode of an electronic device, according to an embodiment.

FIG. 8 is a flowchart of a method 800 for identifying a transmission mode of an electronic device 101, according to an embodiment.

At step 805, the electronic device 101 (e.g., a communication module 190 of FIG. 1) may receive a reference signal. The electronic device 101 may receive the reference signal from a first external electronic device 304 or a second external electronic device 305. The reference signal may be a signal configured to measure a channel between the first external electronic device 304 or the second external electronic device 305. The reference signal may include at least one of a sounding reference signal (SRS) or a demodulation reference signal (DMRS).

At step 810, the electronic device 101 may identify whether a reference signal received power is greater than or equal to a specified first range. As described in detail with reference to FIG. 2, the electronic device 101 may compare a received power of the reference signal with a threshold value to identify whether the received power is greater than or equal to the first range.

When the reference signal received power is less than the first range (e.g., a second range), at step 815, the electronic device 101 may transmit a wireless signal over a single uplink. In this case, the electronic device 101 may transmit information indicating single uplink transmission to the first external electronic device 304. The electronic device 101 may transmit and receive control data to the first external electronic device 304 and may transmit and receive user data except for the control data with the second external electronic device 305. The electronic device 101 may transmit data such that transmission to the first external electronic device 304 and the second external electronic device 305 is not overlapped on a time domain.

When the reference signal received power is greater than or equal to the first range, at step 820, the electronic device 101 may transmit a wireless signal over multiple uplinks. In this case, the electronic device 101 may transmit information indicating multiple uplink transmission to the first external electronic device 304. The electronic device 101 may concurrently or substantially concurrently transmit a signal to the first external electronic device 304 and the second external electronic device 305.

According to an embodiment, a portable communication device may include a first communication circuitry configured to perform communication using a frequency band, a second communication circuitry configured to perform communication using a second frequency band, and at least one processor.

The at least one processor may receive a first reference signal transmitted from a first external electronic device using the first communication circuitry and, when a received power corresponding to the reference signal belongs to a specified first range, may communicate with the outside of the portable communication device through multiple cellular connections. The communicating through the multiple cellular connections may include transmitting a first signal of the first frequency band to the first external electronic device through a first cellular connection established using the first communication circuitry and transmitting a second signal of the second frequency band to the second external electronic device through a second cellular connection (e.g., a connection between the electronic device and a second cell) established using the second communication circuitry.

When the received power corresponding to the reference signal belongs to a specified second range, the at least one processor may communicate with the outside through a single cellular connection. The communicating through the single cellular connection may include transmitting the first signal to the first external electronic device through the first cellular connection and refraining from transmitting the second signal to the second external electronic device through the second cellular connection.

The at least one processor may be configured to receive another reference signal (e.g., a reference signal of the second frequency band) transmitted from the second external electronic device using the second communication circuitry and select one of the multiple cellular connections and the single cellular connection based further on another received power corresponding to the other reference signal.

The at least one processor may be configured to transmit state information indicating that the selected connection is possible to the first external electronic device.

The at least one processor may be configured to transmit power information indicating the received power to the first external electronic device using the first communication circuitry, receive transmission mode information determined based at least in part on the power information from the first external electronic device, and select one of the multiple cellular connections and the single cellular connection based at least in part on the transmission mode information.

The portable communication device may further include a memory for storing a threshold (e.g., a threshold value) corresponding to the received power. The at least one processor may be configured to, when the received power is greater than or equal to the threshold, determine that the received power belongs to the specified first range and, when the received power is less than the threshold, determine that the received power belongs to the specified second range.

The memory may store a first power value and a second power value, which correspond to the threshold. The at least one processor may be configured to identify a first sub-band (e.g., a channel) used for communication between the portable communication device and the first external electronic device in the first frequency band, identify a second sub-band used for communication between the portable communication device and the second external electronic device in the second frequency band, and select one of the first power value and the second power value as the threshold based at least in part on the first sub-band and the second sub-band.

The at least one processor may be configured to use a first RAT (e.g., 4G) for the communication with the first external electronic device and use a second RAT (e.g., 5G) for the communication with the second external electronic device.

The second frequency band may be a frequency band higher than the first frequency band. The at least one processor may be configured to, when the received power belongs to the specified first range, communicate control information with the first external electronic device using the first communication circuitry and communicate data corresponding to the control information with the second external electronic device using the second communication circuitry.

The at least one processor may be configured to identify the received power corresponding to the reference signal based at least in part on an application running on the portable communication device or capacity of data to be downloaded or uploaded through the application.

According to an embodiment, a base station may include a memory (e.g., a RAM and/or a ROM), a communication circuitry (e.g., a communication interface configured to perform wireless and wired communication with another electronic device), and at least one processor. The at least one processor may be configured to transmit a reference signal to an external electronic device using the communication circuitry, receive a received power corresponding to the reference signal, measured by the external electronic device, from the external electronic device and, when the received power corresponding to the reference signal belongs to a specified first range, transmit information indicating communicating through multiple cellular connections to the external electronic device. For example, the communicating through the multiple cellular connections may include transmitting a first signal of a first frequency band through a first cellular connection and substantially concurrently transmitting a second signal of a second frequency band through a second cellular connection. The at least one processor may be configured to, when the received power corresponding to the reference signal belongs to a specified second range, transmit information indicating communicating through a single cellular connection to the external electronic device. The communicating through the single cellular connection may include transmitting the first signal through the first cellular connection and transmitting the second signal to the external electronic device through the second cellular connection.

The at least one processor may be configured to transmit the reference signal using the first frequency band or the second frequency band.

The memory may store a threshold corresponding to the received power. The at least one processor may be configured to, when the received power is greater than or equal to the threshold, determine that the received power belongs to the specified first range and, when the received power is less than the threshold, determine that the received power belongs to the specified second range.

The memory may store a first power value and a second power value, which correspond to the threshold. The at least one processor may be configured to select one of the first power value and the second power value as the threshold based at least in part on the first frequency band and the second frequency band.

The first signal may be a signal based on a first RAT (e.g., 4G), and the second signal may be a signal based on a second RAT (e.g., 5G).

The substantially concurrently transmitting the first signal and the second signal may cause an IMD signal component of the first signal for the second signal.

A portable communication device may include a first communication circuitry configured to perform communication using a first frequency band, a second communication circuitry configured to perform communication using a second frequency band, and at least one processor.

The at least one processor may be configured to receive a reference signal from a first external electronic device using the first communication circuitry and, when a received power of the reference signal belongs to a first range, substantially concurrently transmit a first signal corresponding to at least a part of a first frequency and a second signal corresponding to at least a part of a second frequency band, using the first communication circuitry and the second communication circuitry.

The at least one processor may be configured to, when the received power of the reference signal belongs to a second range, limit transmission of the second signal while transmitting the first signal using the first communication circuitry. The first frequency band and the second frequency band may be a combination of frequency bands in which it is possible for an IMD component of one band to cause noise for another band.

The first range may be greater than or equal to a threshold set for a combination of the first frequency band and the second frequency band, and the second range may be less than the threshold.

The at least one processor may be configured to, when the received power of the reference signal belongs to the second range, limit transmission of the second signal while transmitting the first signal using the first communication circuitry and limit transmission of the first signal while transmitting the second signal using the second communication circuitry. When the received power of the reference signal belongs to the second range, the at least one processor may receive control information from a first external electronic device using a signal of the first frequency band. The at least one processor may be configured to, when the received power of the reference signal belongs to the second range, communicate with a second external electronic device using a signal of the second frequency band based on the control information.

The first external electronic device and the second external electronic device may be base stations configured to perform communication based on different RATs.

The electronic device may perform multi-transmission based on a communication state to increase a transmission rate.

The electronic device may increase a transmission rate by selectively transmitting control information and data.

In addition, various effects directly or indirectly ascertained through the disclosure may be provided.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, a method disclosed herein may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A portable communication device, comprising:
    a first communication circuitry configured to perform communication using a first frequency band;
    a second communication circuitry configured to perform communication using a second frequency band;
    a memory for storing a plurality of threshold values; and
    at least one processor configured to:
    receive a reference signal transmitted from a first external electronic device using the first communication circuitry;
    identify a first sub-band used for communication between the portable communication device and the first external device in the first frequency band;
    identify a second sub-band used for communication between the portable communication device and a second external electronic device in the second frequency band;
    select a threshold among the plurality of threshold values based on the first sub-band and the second sub-band;
    when a received power corresponding to the reference signal is greater than or equal to the threshold, communicate with at least one external electronic device through multiple cellular connections by transmitting a first signal of the first frequency band to the first external electronic device through a first cellular connection established using the first communication circuitry and substantially concurrently transmitting a second signal of the second frequency band to the second external electronic device through a second cellular connection established using the second communication circuitry; and
    when the received power corresponding to the reference signal is less than the threshold, communicate with the at least one external electronic device through a single cellular connection by transmitting the first signal to the first external electronic device through the first cellular connection and refraining from transmitting the second signal to the second external electronic device through the second cellular connection.

2. The portable communication device of claim 1, wherein the at least one processor is further configured to:
    receive another reference signal transmitted from the second external electronic device using the second communication circuitry; and
    select one of the multiple cellular connections and the single cellular connection based further on another received power corresponding to the other reference signal.

3. The portable communication device of claim 2, wherein the at least one processor is further configured to transmit state information indicating that the selected connection is possible to the first external electronic device.

4. The portable communication device of claim 1, wherein the at least one processor is further configured to:
    use a first radio access technology (RAT) for the communication with the first external electronic device; and
    use a second RAT for the communication with the second external electronic device.

5. The portable communication device of claim 4, wherein the second frequency band is a frequency band higher than the first frequency band, and
    wherein the at least one processor is further configured to:
    when the received power is equal to or greater than the threshold, communicate control information with the first external electronic device using the first communication circuitry and communicate data corresponding to the control information with the second external electronic device using the second communication circuitry.

6. The portable communication device of claim 1, wherein the at least one processor is further configured to identify the received power corresponding to the reference signal based at least in part on an application running on the portable communication device or capacity of data to be downloaded or uploaded through the application.

7. A base station, comprising:
    a memory storing a plurality of threshold values;
    a communication circuitry; and
    at least one processor configured to:

transmit a reference signal to an external electronic device using the communication circuitry;
receive a received power corresponding to the reference signal, the received power being measured by the external electronic device, from the external electronic device;
select a threshold among the plurality of threshold values based at least in part on the first frequency band and a second frequency band;
when the received power corresponding to the reference signal is equal to or greater than the threshold, transmit information indicating communicating through multiple cellular connections to the external electronic device by transmitting a first signal of a first frequency band through a first cellular connection and substantially concurrently transmitting a second signal of a second frequency band through a second cellular connection; and
when the received power corresponding to the reference signal is less than the threshold, transmit information indicating communicating through a single cellular connection to the external electronic device by transmitting the first signal through the first cellular connection and transmitting the second signal to the external electronic device through the second cellular connection.

8. The base station of claim 7, wherein the at least one processor is further configured to transmit the reference signal using the first frequency band or the second frequency band.

9. The base station of claim 7, wherein the at least one processor is further configured to communicate using a first radio access technology (RAT) for the first cellular connection and using a second RAT for the second cellular connection.

10. The base station of claim 7, wherein the at least one processor is further configured to:
receive state information indicating that a connection selected from the external device between the multiple cellular connections or the single cellular connection is possible from the external device; and
transmit the information indicating the multiple cellular connections or the information indicating the single cellular connection to the external device based further on the state information.

11. A portable communication device, comprising:
a memory storing a plurality of threshold values;
a first communication circuitry configured to perform communication using a first frequency band;
a second communication circuitry configured to perform communication using a second frequency band; and
at least one processor configured to:
receive a reference signal from a first external electronic device using the first communication circuitry;
select a threshold among the plurality of threshold values based on the first frequency band and the second frequency band;
when a received power of the reference signal is equal to or greater than the threshold, substantially concurrently transmit a first signal corresponding to at least a part of a first frequency and a second signal corresponding to at least a part of the second frequency band using the first communication circuitry and the second communication circuitry; and
when the received power of the reference signal is less than the threshold, limit transmission of the second signal while transmitting the first signal using the first communication circuitry.

12. The portable communication device of claim 11, wherein the threshold is set for a combination of the first frequency band and the second frequency band, and
wherein the second range is less than the threshold.

13. The portable communication device of claim 11, wherein the at least one processor is further configured to:
when the received power of the reference signal is less than the threshold, limit transmission of the second signal while transmitting the first signal using the first communication circuitry and limit transmission of the first signal while transmitting the second signal using the second communication circuitry.

14. The portable communication device of claim 13, wherein the at least one processor is further configured to, when the received power of the reference signal is less than the threshold:
receive control information from a first external electronic device using a signal of the first frequency band; and
communicate with a second external electronic device using a signal of the second frequency band based on the control information.

15. The portable communication device of claim 14, wherein the first external electronic device and the second external electronic device are base stations configured to perform communication based on different radio access technologies (RATs).

* * * * *